United States Patent
Bellessort et al.

(10) Patent No.: US 8,819,232 B2
(45) Date of Patent: Aug. 26, 2014

(54) METHOD AND SYSTEM FOR MANAGING ACCESS TO A RESOURCE

(75) Inventors: Romain Bellessort, Rennes (FR); Youenn Fablet, La Dominelais (FR); Herve Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 274 days.

(21) Appl. No.: 13/352,214

(22) Filed: Jan. 17, 2012

(65) Prior Publication Data

US 2012/0185596 A1   Jul. 19, 2012

(30) Foreign Application Priority Data

Jan. 19, 2011   (GB) .................................. 1100923.0

(51) Int. Cl.
*G06F 15/16*   (2006.01)
*G06F 15/173*   (2006.01)

(52) U.S. Cl.
USPC ........................... 709/225; 709/217; 709/223

(58) Field of Classification Search
USPC .................................. 709/203, 217–219, 225
See application file for complete search history.

(56) References Cited

U.S. PATENT DOCUMENTS

| | | | |
|---|---|---|---|
| 6,173,322 B1 * | 1/2001 | Hu ................................ | 709/224 |
| 6,182,140 B1 | 1/2001 | Feig et al. | |
| 6,766,373 B1 * | 7/2004 | Beadle et al. ................. | 709/227 |
| 8,341,135 B2 * | 12/2012 | Uetabira et al. .............. | 707/705 |
| 2004/0107296 A1 | 6/2004 | Donker et al. | |
| 2010/0287192 A1 | 11/2010 | Kottomtharayil et al. | |

FOREIGN PATENT DOCUMENTS

| | | |
|---|---|---|
| EP | 1041496 A2 | 10/2000 |
| WO | WO 2005/109251 A2 | 11/2005 |
| WO | WO 2006027973 A1 * | 3/2006 |

* cited by examiner

*Primary Examiner* — Joshua Joo
(74) *Attorney, Agent, or Firm* — Canon U.S.A., Inc. IP Division

(57) ABSTRACT

The present invention relates to a method and a system for managing access to a resource, copies of which are hosted in apparatuses of one or more networks. The method comprises obtaining a list comprising a plurality of references pointing to the plurality of copies of the resource; for each of said references, determining at least one accessibility rating representing the accessibility of the corresponding copy for the given user device, and, based on the at least one accessibility rating, deciding between keeping the corresponding reference in the list or deleting it therefrom, to obtain an updated list; and selecting a reference from the updated list for the given user device to access the resource.

20 Claims, 7 Drawing Sheets

| Title (10) | ID (11) | References (12) | Reference Properties (13) |
|---|---|---|---|
| Image 1 | abc:001 | http://dev_a/IMG_1.jpg<br>http://sample.org/a/IMG_1.jpg<br>http://home_server/IMG_1.jpg | Local device – Temporary<br>Web<br>Home server – Stable |

Figure 1a

```
<entry>
    <title>Image 1</title>
    <id>abc:001</id>
    <link href="http://dev_a/IMG_1.jpg" rel="self" access="local"
                                    storage="temporary" size="54321" />
    <link href="http://sample.org/a/IMG_1.jpg" rel="self" access="web"
                                                        size="123456" />
    <link href="http://home_server/IMG_1.jpg" rel="self" access="home"
                                        storage="stable" size="1337000" />
</entry>
```

Figure 1b

```
<?xml version="1.0" encoding="utf-8"?>
<feed xmlns="http://www.w3.org/2005/Atom">

<title>Alice Feed</title>
    <link href="http://example.org/"/>
    <updated>2003-12-13T18:30:02Z</updated>
    <author>
        <name>Alice</name>
    </author>
    <id>urn:uuid:60a76c80-d399-11d9-b93C-0003939e0af6</id>

<entry>
        <title>...      </title>
        <link href="..."/>
        <id> ...        </id>
        <updated>...    </updated>
        <summary>...    </summary>
        <content type="image/jpeg" src="..." />
    </entry>

</feed>
```

Figure 1c

```
<entry>
    <title>Image 1</title>
    <id>abc:001</id>
    <link href="http://dev_a/IMG_1.jpg" rel="self" access="local"
                                    storage="temporary" size="54321" />
    <link href="http://sample.org/a/IMG_1.jpg" rel="self" access="web"
                                                          size="123456" />
</entry>
```
Figure 1d
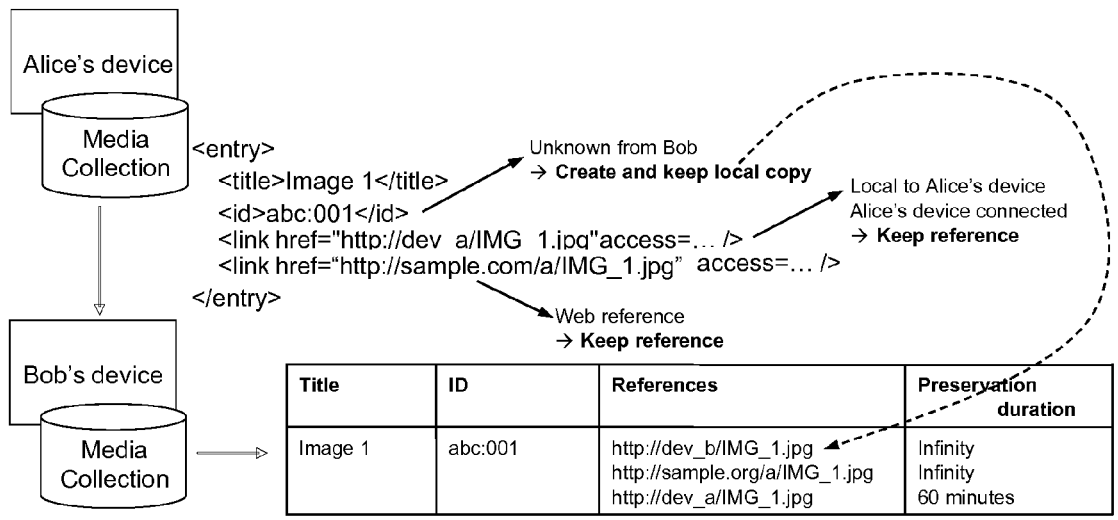
Figure 1e
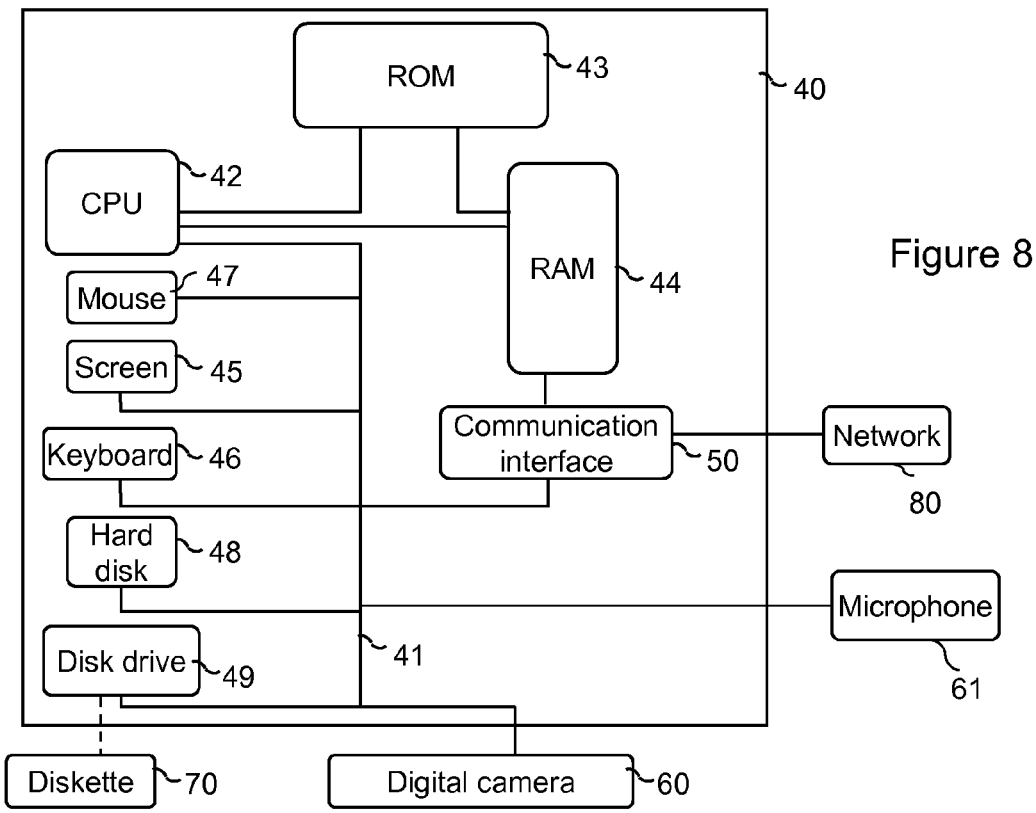
Figure 8

METHOD AND SYSTEM FOR MANAGING ACCESS TO A RESOURCE

This application claims priority from GB patent application No. 11 00923.0 of Jan. 19, 2011 which is incorporated herein by reference.

FIELD OF THE INVENTION

The invention relates to the access to resources, such as digital data items or documents.

More specifically, the invention relates to a method and a system for managing access to such a resource, copies of which are hosted in apparatuses of one or more networks.

The invention may be implemented for example when several devices intend to share resources.

BACKGROUND OF THE INVENTION

Data sharing amongst several users (i.e. devices) involves publishing a collection of resources by each user device or system, referred to as a source system, such that other user devices, referred to as target systems, can be aware of and access the resources.

Such publishing enables several copies of the same resource to be known by the users. The latter can then seamlessly switch between hosting devices and/or between networks comprising these devices, i.e. change hosting device or network without losing access to the required resource.

For example, this is implemented in peer-to-peer (P2P) systems.

In public P2P systems, several versions or copies of the same resource, generally a digital file such as an audio or video file, may have been created and disseminated through the P2P network. When a user intends to access this resource, an appropriate search (by name criterion for example) provides a list of references to the user, each reference being associated with a version or copy of the resource.

The list may give a description of the resource and may be sorted by ordering according to one or several criteria, for example the number of seeders or the number of leechers. The number of seeders is in particular representative of an accessibility rating: the more seeders there are, the greater the availability of the digital file on the network.

Moreover, each reference of the list may correspond to a plurality of copies of the same digital file hosted in numerous apparatuses of the P2P network.

When accessing the P2P network to obtain a copy of the resource, the user device uses the provided references to select a copy and then access one or more hosting apparatuses.

However, data sharing is not limited to P2P systems. Data sharing for a resource may for example also be provided in local or private networks.

In such a case, local or private references specific to the local or private network are used, that cannot be resolved by a user external to the network, as is possible for global references.

Depending for example on the nature of networks, the nature of connections or relationships between devices and the nature of the networked apparatuses, there may be many references associated with the same resource, but which have different meanings for different user devices.

In addition, a resource that is accessed by a user device and is thus copied locally may be published and thus greatly increases the number of references to the resource. Since this number increases, the storage memory required for any device receiving the list of references increases. The processing to identify a relevant reference that gives actual access to the resource also increases correspondingly.

There is therefore a need to improve management of such references to access the resources.

GOALS OF THE INVENTION

The invention seeks to overcome the above drawbacks of the prior art at least partly, in particular to provide a solution to the above need.

More specifically, it is an aim of at least one embodiment of the invention to provide a technique to manage the access to a resource for a user device, when several copies of the resource are hosted by several apparatuses of one or more networks.

At least one embodiment of the invention is also directed to providing such a technique to ensure that the user may, in return, provide the resource to another user device.

It is another aim of at least one embodiment of the invention to provide such a technique to ensure that the resource may be retrieved later on, for example because the bandwidth or the time available cannot afford complete access to the resource at a given time.

It is yet another goal of at least one embodiment of the invention to limit the increase in storage memory and in processing for the user devices, as the number of references to a resource increases.

SUMMARY OF THE INVENTION

To that end, a first aspect of the invention relates to a method as defined in the appended claims.

The invention reduces the number of references to be considered by the given user device when actually accessing the resources. This is achieved by assessing an accessibility rating of each reference to discard those references that are not capable of being accessed by the user device, for example because the reference points to a private network to which the user device does not belong. The user device then accesses the resource using one of the kept references.

In this respect, the updated list handled by the user device saves storage memory and also reduces the processing required to determine a relevant reference for accessing the resource.

Correlatively, a second aspect of the invention relates to a system as defined in the appended claims.

A third aspect of the invention relates to an information storage means, able to be read by a computer system, comprising instructions for a computer program adapted to implement the method as set out above, when the program is loaded into and executed by the computer system.

A fourth aspect of the invention relates to a computer program product able to be read by a microprocessor, comprising portions of software code adapted to implement the method as set out above, when it is loaded into and executed by the microprocessor.

The system, the computer program and the information storage means may have features and advantages that are analogous to those set out above in relation to the method for managing the access to a resource.

Optional features of the invention are further defined in the dependent appended claims.

In particular, the method may further comprise providing the updated list from a first user system to the given user device through a communications network, and wherein the obtaining, the determining and the deciding are performed on the first user system.

According to this provision, the given user device can exploit the updated list on receiving it. This makes it possible to drastically reduce processing and storage memory on the device of the user requesting the access to the resource.

Furthermore, this provision makes it possible for the first user system that provides the updated list to prepare such a list in advance to receiving any request from a given user device. For example, this preparation in advance may be based on a predefined classification of the potential requesting user device, for instance by considering the devices connected to the same private network. In this respect, upon request from a given user device, the provision and the use of the updated list may be immediate.

According to a particular feature, the first user system determines whether the copy at said reference is reachable by the given user device, and if not assigns a low accessibility rating to the reference, i.e. a rating that is unfavourable for selection of the reference. In particular, the references with an assigned very low accessibility rating may also be deleted from the list.

For illustrative purposes, the first user system may for example discard all the references that are specifically local and private to itself, and/or that are local to networks to which the given user device does not belong.

This provision seeks to optimize the updated list sent to the user device requesting the access, since it avoids the user device having to handle references it cannot reach.

In one embodiment, the method of the invention is performed on the given user device.

This provision enables a more accurate decision process as to whether references must be kept or deleted, since more relevant criteria regarding the given user device may be applied for such a process. This results in obtaining a more optimized updated list.

According to one aspect of the invention, the at least one accessibility rating for a reference is based on a connection criterion or connection criteria.

A connection criterion regarding either the given user device or the hosting apparatuses or both is indeed relevant, since it may directly reveal that the given user device cannot reach a resource of the list. Therefore, using this criterion, a more relevant updated list can be quickly obtained.

In particular, the at least one accessibility rating for a reference may comprise a stability rating representing the ability of the corresponding copy to remain present and valid over time on the corresponding network hosting apparatus.

The stability rating is one of the most relevant criteria, since it directly characterizes whether or not the copy can be relied upon over time. For illustrative purposes, it reflects for example the fact that a reference such as a URL on a photo-sharing web site is likely to remain valid for a long time, whereas a URL referring to a web server hosted locally in a mobile device such as a camera is likely to be valid only for a short time.

According to another particular feature, the at least one accessibility rating for a reference comprises an availability rating representing the ability of the corresponding network hosting apparatus to be reached by any user on a network.

The availability rating of the hosting apparatus is also a relevant criterion, since it directly characterizes whether or not this hosting apparatus can be relied upon over time. For illustrative purposes only, if the given user device is not connected to the network to which the hosting apparatus belongs, the resource associated with a URL is not available. On the other hand, a URL pointing to the first user system sending the updated list to the given user device appears to be available to the given user device as long as that user device remains connected to the first user system.

In particular, the stability or availability rating for a reference may be a function of the private/public nature of the network to which the corresponding network hosting apparatus belongs, and in case the hosting apparatus belongs to a local or private network, it is furthermore a function of the belonging or non-belonging of the given user device to that local or private network.

This provision makes it easy to discard the references that the given user device cannot reach, mostly because they are hosted in networks unreachable by the user device. The updated list handled for accessing the resource is thus optimized.

According to another particular feature, the stability or availability rating for a reference is further adjusted based on a history of connections to the corresponding network hosting apparatus.

This provision may make it possible to compensate for low availability of stable references if they are however intensely used by users.

According to another particular feature, the stability or availability rating for a reference is further adjusted based on respectively at least one stability or availability factor chosen from metadata associated with the reference and/or from a history of connection to the reference.

This provision may make it possible to take into account a stability or instability factor, as well as an availability or unavailability factor that could alter or promote the accessibility to the resource using the corresponding reference.

In one embodiment of the invention, the at least one accessibility rating for a reference is based on metadata associated with the reference in the obtained list.

The metadata may be, for example, information about connection of the corresponding network hosting apparatus, about the stability of the copy over time, or about the size of the corresponding copy. This enables fast estimation or evaluation of any of the ratings.

In one embodiment of the invention, the updated list is provided in a web feed format.

Thanks to this format, the updated list may be easily managed, for example for further transmission to another user or for upgrade.

In another embodiment, the method further comprises obtaining the updated list by the given user device; and, for each reference of the obtained list, evaluating, by the given user device and based on the corresponding at least one accessibility rating, a period of accessibility to the corresponding copy for the given user device, wherein the given user device takes into account the periods of accessibility to select a reference for accessing the resource.

For example, to access the resource, the user may selectively and successively consider the references of the updated list sorted in decreasing order of accessibility periods, taking into account the time elapsed since obtainment of the updated list. This provides a more efficient way for the user to appropriately select the most relevant reference, and thus to obtain efficient access to the desired resource.

In particular, the method may further comprise, if the resource corresponding to the obtained updated list is not locally known by the given user device, creating a local copy of the resource by using a reference of the obtained updated list; and adding, to the obtained updated list, a new reference pointing to the local copy thus created.

This ensures that the user may, in return, provide the resource to any other user.

According to a particular feature, the created copy is a degraded version of the copy pointed to by the reference used.

For example, the degraded version may be a copy with lower resolution than the original copy located at the reference. This enables the user to provide the resource at a lower bandwidth cost, hence to a greater number of other users.

Moreover, it also enables less storage space to be used, which may be especially appropriate for use in constrained systems.

According to another particular feature, the method further comprises periodically updating the evaluation of the accessibility periods.

This may be periodically updating either the availability rating or the stability rating or both. This makes it possible to take into account the fact that the resources or the copies are not meant to be definitive.

According to another particular feature, an evaluated accessibility period for a reference depends on a first accessibility period determined based on a stability rating associated with the reference, on a second accessibility period determined based on an availability rating associated with the reference, and on a current accessibility period related to the remaining time of an accessibility period evaluated or determined earlier (for example the last evaluated accessibility period).

For illustrative purposes only, the evaluated accessibility period may be the maximum value of the three periods, thus avoiding the removal of a reference that appears to be useful. This may also be the minimum value of the three periods in order for the invention to keep a fewer number of references, these being the most efficient ones. This may also be any combination of these three periods such as half the current accessibility period plus half the minimum value between the first and second accessibility periods.

It is to be noted that the current accessibility period taken into account tends to reflect what was determined or evaluated at a previous time, i.e. possibly at another time (for example when the reference was first known) when the context was different. Given the context changing, it may be that the first and second accessibility periods become very low, such that the earlier evaluated accessibility period should be used in preference.

BRIEF DESCRIPTION OF THE DRAWINGS

Still other particularities and advantages of the invention will appear in the following description, illustrated by the accompanying drawings, in which:

FIG. 1a illustrates an exemplary collection made of a single resource;

FIG. 1b illustrates an example of an XML entry to store information of FIG. 1a;

FIG. 1c illustrates a sample Atom Web Feed;

FIG. 1d illustrates a generated Web Feed entry;

FIG. 1e illustrates operations and the resulting list of references;

FIG. 8 shows a particular hardware configuration of a device able to implement the method according to the invention.

DETAILED DESCRIPTION OF EMBODIMENTS OF THE INVENTION

Figures 2, 3:
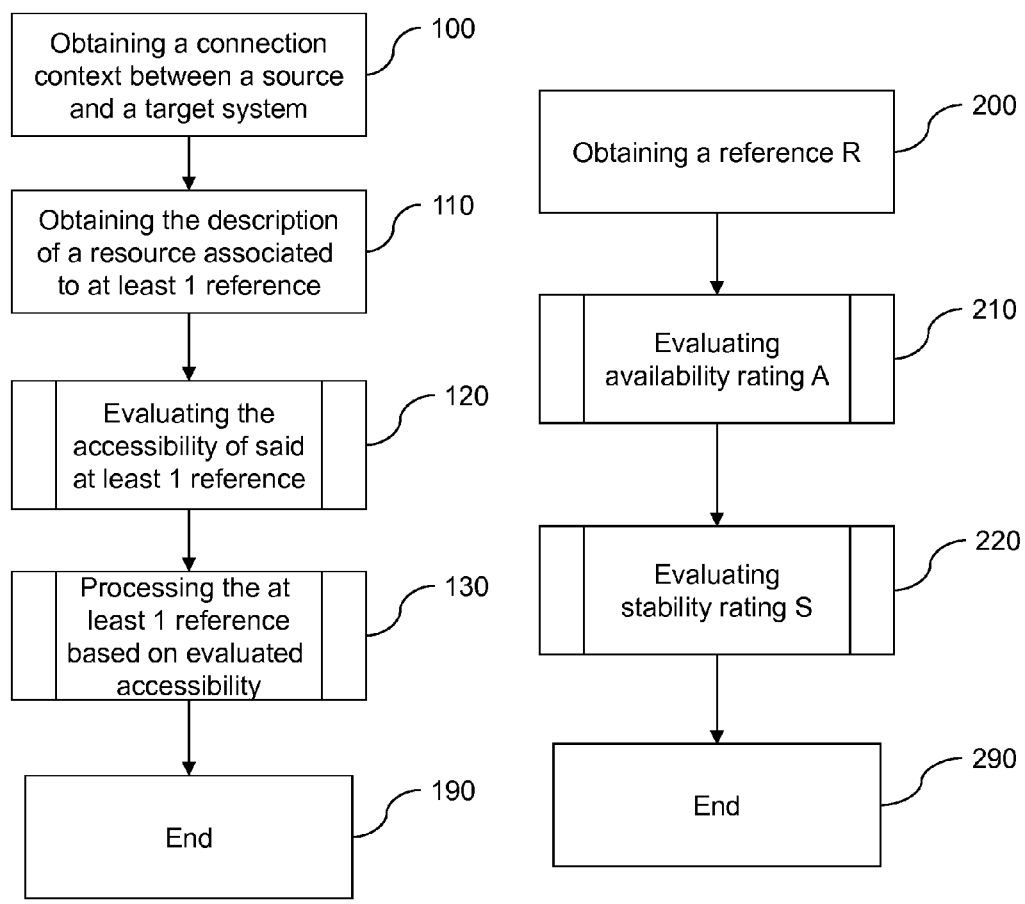
FIG. 2 illustrates, in flowcharts, general steps of a method according to the invention to generate an updated list for a specific target system.
FIG. 3 illustrates the evaluation of the accessibility rating of a reference.

FIG. 1 illustrates an exemplary application of the present invention. This is an example in which Alice and Bob meet together, each having a device which contains a picture collection. The devices may be mobile or wireless devices of a wireless communications network.

The content of the collections can be shared thanks for example to web feeds.

Alice, as a first user device or system acting as a source system, shares her collection with Bob, acting as a target system. The collection of FIG. 1a comprises a single resource for illustrative purposes, although the invention applies to multiple resource collections.

The single resource is an image with a title (10) "Image 1" having an identifier (11) ID=abc:001. Such an identifier structure is common to web feeds.

Three versions or copies of this image are known by Alice's device, listed in the figure as three references (12) hosted by three different network hosting apparatuses:
    one reference which is local to the device (http://dev_a/IMG_1.jpg);
    one reference which is located on the Web (http://sample.org/a/IMG_1.jpg);
    one reference which is located on a home server (e.g. at Alice's home) (http://home_server/IMG_1.jpg).

A set of descriptions or properties (13) is also provided for each of the references 12: for example the origin of the reference ("local device", "web", "home server") and an indication of a corresponding accessibility period ("stable", "temporary").

The origin of the reference is not necessarily determined by Alice's device (the source system) itself. For instance, the fact that a reference refers to a home server may be known only by the home server itself, which may then share this information with the devices connected to the home network (which is the case for Alice's device at least during a part of the day).

Similarly, whether the reference is stable or temporary cannot always be known. This kind of information is preferably provided by the host of the resource (home server, web server, Alice's device) as it is more likely to have such information.

FIG. 1b illustrates an example of an XML entry (inspired by Atom format, though not fully compliant with it) to store the information of FIG. 1a. This entry may be part of a Web Feed stream, which may advantageously be sent from Alice to Bob in order to share her collection. The processing according to the invention can be applied to the references on Alice's device (i.e. before generating such Web Feed which may then comprise fewer references) or on Bob's device (i.e. based on this Web Feed received by Bob).

Web Feeds are documents used to describe a list of contents or "entries" (e.g. a list of articles, updates or photos published on a web site). The two main Web Feed formats are RSS and Atom, which provide quite similar features.

FIG. 1c provides a sample Atom Web Feed: first, the feed properties are described (including feed's title and author), and second, an "entry" element describes a content published on the web site example.org using for example a title, a link to a web page, a unique identifier, an update time, a summary and an image associated with the content.

In the context of the invention, such an entry is illustrated in FIG. 1b. The number of "entries" in the Alice's Web Feed however corresponds to the number of resources listed in Alice's collection.

The Web Feed entry comprises URLs (standing for "Uniform Resource Locator"—referenced "href" in the Figure) as references for resources. The URLs locate the corresponding copies or versions of the resource on hosting systems.

The properties associated with the references are included in the Web Feed through the attribute "access" defining the access mode of the reference (i.e. the origin of the reference such as "local device", "web", "home server"; the attribute "storage" defining an accessibility criterion over time ("stable", "temporary"); and an attribute "size" defining the size of the copy or version corresponding to the reference.

The attribute "access" in particular makes reference to a distinction between "private" and "public" in the meaning of networks or connectivity. In this respect, a private reference has a meaning only in the context of a private connection, while a public reference has a meaning in the context of a public connection. Typically, a private reference can be a URL referring to a local host on a private network. One skilled in the art knows that IP addresses starting with "192.168." are generally private addresses that can be resolved only on a private network, but not on a public network such as the Internet.

As will be described below, these properties (attributes) are used in the course of determining whether or not a reference is capable of being accessed by Bob, such that it must accordingly be kept or deleted from the list of references to be provided to Bob.

Although this example shows the attributes of reference properties in an XML "link" element, other ways to provide such properties to the systems implementing the invention may be used.

From the information available for each reference listed in FIG. 1a (possibly received through the Web Feed of FIG. 1b), the references that are of interest for Bob's device are identified and kept in the list of references to be provided to Bob: the reference local to Alice's device is useful as it can be resolved as long as Alice and Bob are connected together; the reference on the Web is also useful since Bob has generally access to the public network.

Conversely, the references of no interest for Bob's device are identified and deleted from the initial list of references: for example the reference to Alice's home server is deleted therefrom since there is no reason for Bob's device to be able to access the source system home server (in specific cases, it may be the case, but it is assumed here that it is not).

These decisions of keeping or deleting a reference in this example are mainly based on the "access" attribute. Below, other attributes will be taken into account to refine these decisions.

FIG. 1d represents a resulting Web Feed entry that can be sent to Bob's device, when the decisions of keeping or deleting are performed on Alice's device.

This generated web feed (comprising an updated list of references compared to the original list comprising all the references known by Alice's device) is then received and processed by Bob's device, in order to import the corresponding resource from Alice's collection and access the resource.

For each of the references available in the Web Feed, Bob's device determines an appropriate period of accessibility or "duration of preservation" that gives information on whether the reference is accessible for a long time or not. This information aims to make it possible to refine the list of references at Bob's end to optimize the access to the resource.

For example, Bob's device first checks whether the resource associated with the ID=abc:001 is already known locally. Indeed, that resource may already exist in Bob's collection (possibly with different references).

Assuming here that the resource is unknown locally, an attempt is made to obtain it from one of the references received through the Web Feed.

The first reference considered is local to Alice's device (http://dev_a/IMG_1.jpg). Since the current connection between Bob's and Alice's devices is local, this reference can be used to obtain the resource by Bob's device.

A local copy (possibly a degraded one, e.g. with lower resolution/size) is then created on Bob's device through accessing the resource at the first reference. This local copy is intended to remain accessible on Bob's device to make it possible for other target system to access the resource at least through this "local" reference. To that end, the corresponding preservation duration is set to infinity, meaning that the reference remains valid for a long time.

For its part, the first reference which is local to Alice's device should not be kept for too long, since the local connection between Alice's device and Bob's device is liable to end at any time. In this respect, a corresponding preservation duration of about 60 minutes can be set. Furthermore, if Alice's device is still available after a part of this duration (for example after 45 minutes), the corresponding preservation duration may be extended.

Regarding the second reference received (http://sample.org/a/IMG_1.jpg), since it is a web reference, it may be considered as remaining valid for a very long time. Correspondingly, its preservation duration is set to infinity. Thus, as soon as it is connected to the Web, Bob's device will be able to retrieve the resource (which may be available in a better version than the local copy), if needed.

Below, with reference to FIG. 7, a way to compute and obtain such preservation durations is described.

FIG. 1e illustrates these operations and the resulting list of references that Bob's device has in order for it to access the resource "Image 1".

A method according to the invention is now described in detail, with reference to FIGS. 2 to 7, that:
  obtains, for example on a source system (Alice's device) a list comprising a plurality of references pointing to the plurality of copies of the resource;
  for each of the references of the list, determines at least one accessibility rating representing the accessibility of the corresponding copy for a target system (Bob's device), and, based on the at least one accessibility rating, decides between keeping the corresponding reference in the list or deleting it therefrom, to obtain an updated list; and
  selects or uses a reference from the updated list for the target system to access the resource.

FIG. 2 is a flowchart illustrating general steps of a method according to the invention to generate the updated list for a specific target system. This method creates a description of resources having references, this creation being based on an accessibility criterion.

In one embodiment, the accessibility rating or criterion for a reference is based on a connection criterion or connection criteria.

To that end, the process starts at step 100 by obtaining a connection context between a source system (Alice) and a target system (Bob).

The connection context may comprise the type of network connection (e.g. private or public) and a bandwidth (which may be theoretical or measured). In addition or alternatively, it may comprise one or more of the parameters chosen from the following non-exhaustive list: whether the source or target system has other network interfaces; the frequency of connection between source or hosting and target systems; more detailed information about the bandwidth such as statistics; whether the users of source and target systems know each other as friends for a given social network.

Finally, it should be noted that a connection context may either be a real connection between the two systems, or a connection model (e.g. the source system connected to any system of a local private network).

Step 100 may be performed either on the source system, or on the target system.

At step 110, the description of a resource is obtained. This description comprising at least one reference enabling the retrieval of said resource. As shown in the above examples, the reference may be a URL pointing to the resource, and the description may be expressed in an XML format such as in a Web Feed.

Following step 110, an accessibility rating of the reference or references is evaluated based on the connection context, at step 120 (further described below with reference to FIG. 3). This step aims at determining the interest of each reference for the target system considered (i.e. for Bob in the example above).

Figure 6:
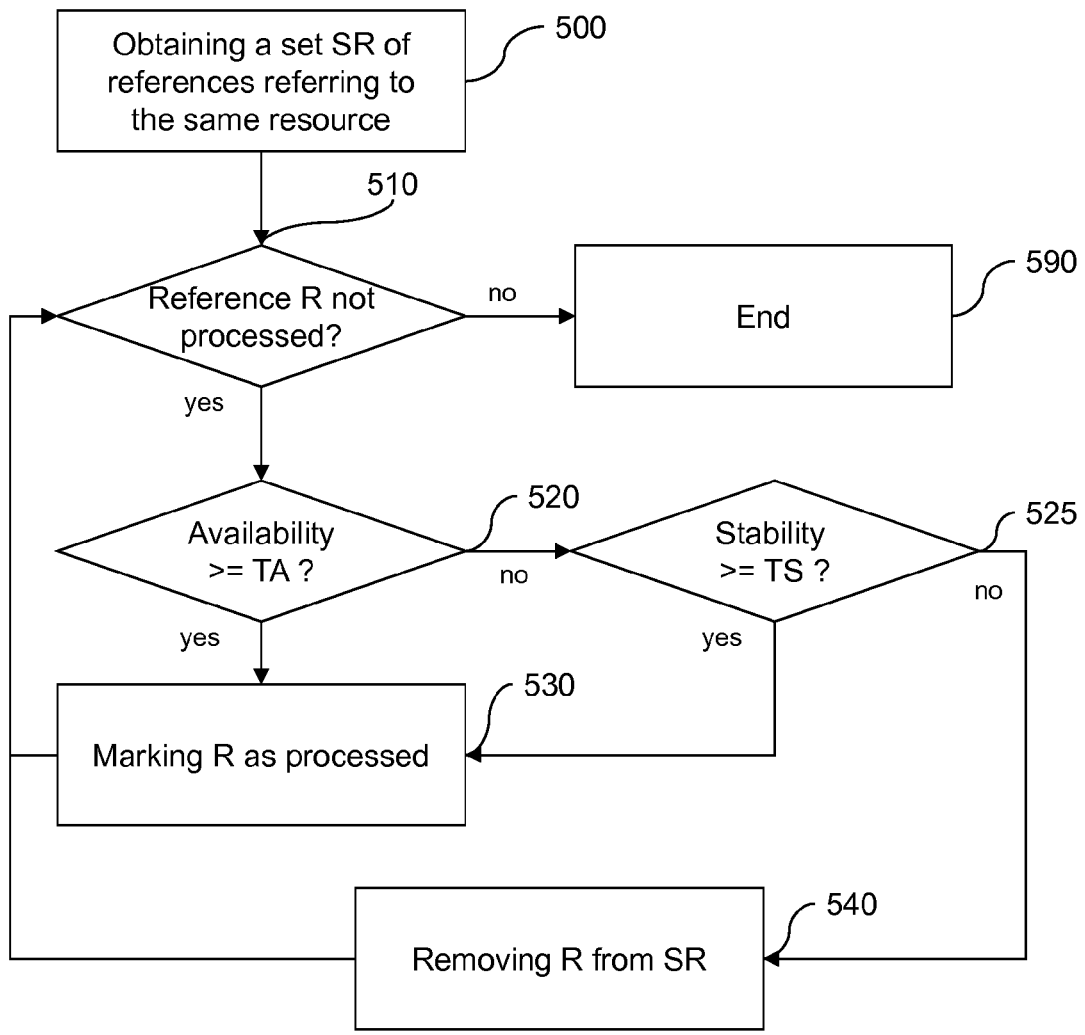
FIG. 6 illustrates, in a flowchart, steps for determining whether a reference is to be kept or deleted from an original list to obtain the updated list of FIG. 2.

Once step 120 of evaluating the accessibility rating is completed, each reference is processed in order to determine whether it is to be kept or deleted from the list of references, at step 130. This processing, described here below with reference to FIG. 6, is based on the evaluated accessibility ratings.

For example, step 130 considers the relevancy of the reference for the current connection context (between Alice and Bob) and the relevancy for the future.

Generally at least two references are processed at steps 120 and 130 in such a way that at least one is deleted from the list, based on the corresponding accessibility rating. The resulting list is consequently optimized in that it may provide a more efficient access to the resource for the target system considered.

After completion of step 130, the process ends at step 190.

As mentioned previously, all or part of these steps may be implemented either on the source system (Alice) or on the target system (Bob).

For example, the evaluations of step 120 may be processed on the source system, making the resulting accessibility ratings available to the target system (e.g. through the Web Feed) before the latter performs step 130.

In another example, all the steps (obtaining the list [110]; evaluating [120] and deciding between keeping or deleting a reference [130]) are advantageously performed on the source system, prior to actual connection of the target system (i.e. prior to receiving the request for the collection from the target system). In this case, the description of the references may be created for a category or class of target systems. For example, a category or class may comprise all the devices connected to the same private network or sharing the same other criterion. Then, once the description for each category has been created in advance, it can be provided to a target system as soon as it is requested, based on the target system's category.

It may be noted that the source system can decide to update the description each time a resource of its collection is updated, to remain up-to-date.

The evaluation of the accessibility rating for a resource reference is now described with reference to FIG. 3.

Determining the accessibility rating starts at step 200 by obtaining a reference R from amongst all the references of a resource.

Various properties of the reference may be evaluated, all these properties being part of the accessibility of the reference. In FIG. 3, two accessibility components are considered successively:
- a stability rating representing for example the ability of the reference to remain present and valid over time on a corresponding hosting apparatus for any target system in the network; and
- an availability rating representing the ability of the device or apparatus hosting that reference to be reached by any target system in the network.

The availability rating is evaluated at step 210 (detailed below with reference to FIG. 4). A reference is considered as available when it can be resolved. For instance, in the context of a connection to a private network without access to the Internet, a URL pointing to the Internet is not available. As another example, a URL pointing to the source system is always available for the source system.

The stability rating is evaluated at step 220 (detailed below with reference to FIG. 5). A reference is considered as stable when it remains valid over time on its network hosting apparatus. As an example, a URL on a photo-sharing web site is likely to remain valid for a long time, whereas a URL referring to a web server locally hosted by a mobile device such as a camera is likely to be valid only for a short time.

The availability and stability ratings may be evaluated based for example on the following criteria:
- whether or not the reference is private or public (the access mode);
- metadata possibly associated with resources and references;
- connection history (if it exists) (either for the source system or for the target system).

Following steps 210 and 220 (these two steps may be however done in the reverse order), the process ends at step 290.

Figure 4:
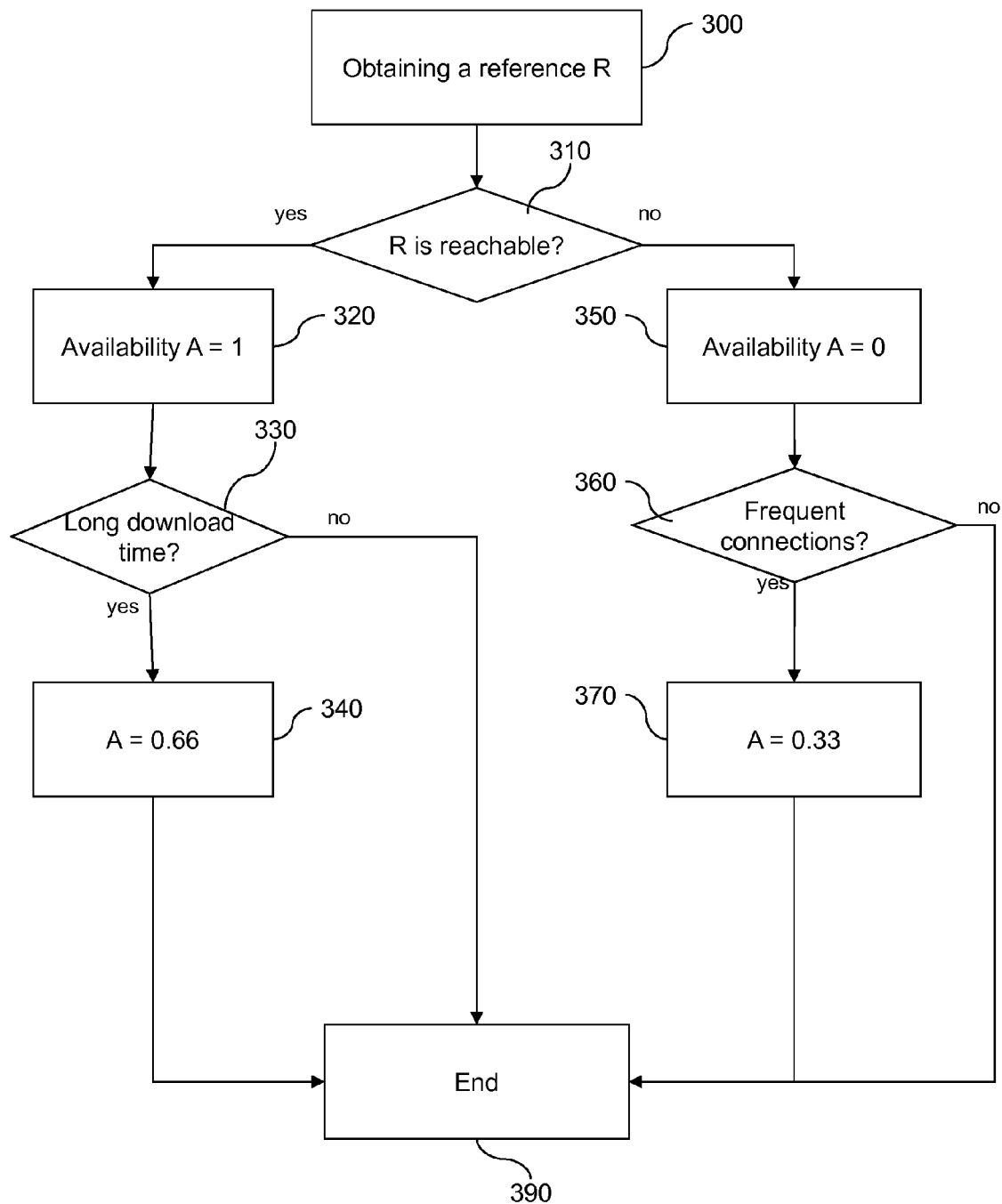
FIG. 4 illustrates the evaluation of the availability rating of a reference taken into account in the corresponding accessibility rating of FIG. 3.

FIG. 4 illustrates the evaluation of the availability rating of a reference. This process starts at step 300 by obtaining the current reference R to evaluate.

Then, at step 310, it is determined whether the resource pointed to by that reference R (i.e. the resource associated with that reference) is reachable.

As previously explained, some of the referenced resources may not be reachable depending on the connection context between the source system and the target system (or the category of target systems that is considered). For instance, a referenced resource on a private network is not reachable for a device which is not connected to that private network. Similarly, when connected to only a private network (e.g. a private local network between several devices), the resource at a public reference (e.g. on the Internet) may not be reachable.

If the resource at the reference R is determined to be reachable, the availability rating A associated with that reference R is set to 1 (step 320). This is because since it is reachable, it can be obtained, and so it is available.

The availability rating A may be slightly decreased in case an estimated download time for downloading the resource at the reference R is large compared to a threshold.

Estimation of the download time may be based on two parameters: the file size (see the attribute size in FIG. 1b) and the current connection bandwidth between the target system and the hosting device corresponding to the reference R (i.e. the device hosting the resource associated with that reference).

Depending on the information available and the current connection context, those two parameters may either be actual values, or estimated values. For instance, if the size of an image is not known but its resolution is known, its size can be estimated.

The threshold for download time may be a predefined property, or a setting defined by the user. In the example of FIG. 1b, it may be noted that the resource version hosted by the home server is quite large, and therefore that it may not be efficient to retrieve it in the context of a low bandwidth connection.

More generally, any kind of unavailability factor can be estimated or evaluated in order to determine whether the availability rating should be decreased or not. As an example, in the case of video files, whether the codec is supported or not by the target device may affect the evaluation of the accessibility rating, and so be considered as an unavailability factor.

The download time (or more generally the presence of an unavailability factor) is checked at step 330, and if too large compared to a predefined threshold, the availability rating A associated with the reference R is decreased to the value 0.66 at step 340.

The value 0.66 is one possible value among other possible values. Finer approaches to modify the rating A are possible. In particular, the new value may depend more closely on the unavailability factor: for example, if the unavailability factor in step 330 is determined from the ratio between the size of the referenced resource (in bytes) and the connection bandwidth (in bytes/second), it may be decided that below a first threshold T1 (e.g. 2 s) the value of the availability rating is not modified, while above a second threshold T2 (e.g. 10 s), the value of the availability rating is decremented by the maximum value of 0.5. Between those two thresholds, a linear decrement is applied.

After step 340, as well as after step 330 if there is no unavailability factor, the process ends at step 390.

Back to step 310, if the resource at the reference R is not reachable, the availability rating A associated with the reference R is then set to 0 at step 350. This is because if the referenced resource is not reachable, the resource is not available when using that reference R.

Nevertheless, in some cases, it may be relevant to increment this value since there may be objective reasons and factors showing that this reference is sometimes used.

In particular, the availability rating may be adjusted based on a history of connections to the network apparatus hosting the reference. Thus, at step 360, the availability rating is evaluated based on connection history reflecting whether or not frequent connections are made with the device hosting the reference R.

If that is the case, the availability rating is set to the value 0.33 at step 370. Other values and other mechanisms to progressively increase the availability rating depending on the history may be provided at this step, in a similar way as described above for the decrease of the availability rating A.

If there are no frequent connections at step 360, the availability rating is kept unmodified at 0. In such a case or after step 370, the process ends at step 390 with an evaluated availability rating.

In one embodiment, this processing for evaluating an availability rating A may be simplified by avoiding the adjustments of steps 340 and 370. In this case, the process is stopped right after step 320 or step 350.

In another embodiment, the evaluation of the rating A may further take into account a social relationship between the source system (Alice) and the target system (Bob). For example, the availability rating is evaluated as described above only if the source system and the target system are connected together in a social network. On the other hand, the availability rating A is set to 0 if they are not connected in such a social network.

Figure 5:
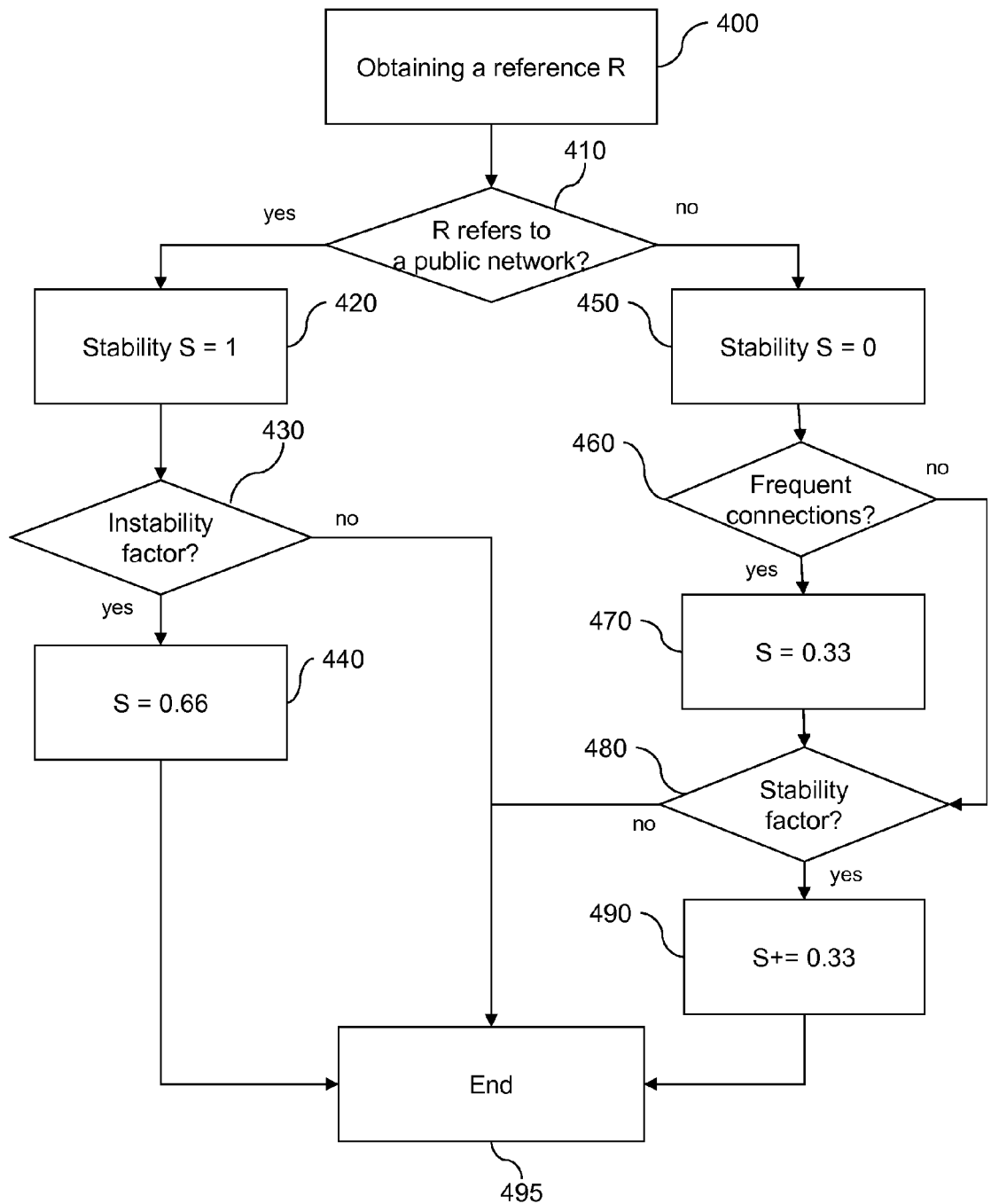
FIG. 5 illustrates the evaluation of the stability rating of a reference taken into account in the corresponding accessibility rating of FIG. 3.

FIG. 5 illustrates the evaluation of the stability rating of a reference. This process starts at step 400 by obtaining the current reference R to evaluate.

Then, at step 410, it is determined whether or not this reference R refers to a public network or not.

Such determination may be based on the address set in the URL defined for the reference R.

As an example, and as one skilled in the art knows, an IP address starting with "192.168." is a private IP address. Therefore, such an IP address can be resolved only on a private network, and not from outside that private network. If the reference R comprises such an IP address, it does not refer to a public network, but to a private network.

If needed, the IP address may be retrieved from a web site address, through a request to a DNS system.

If the reference R refers to a public network, its associated stability rating S is set to 1 at step 420. This is because, as a first approximation, it is considered that a reference to a public network such as the Internet is likely to remain valid over time.

However, this may not always be true. Therefore, at step 430, it is evaluated whether the reference R is associated with an instability factor. Such a factor may either come from the description of the resource which comprises the reference R, or from the system performing the evaluation, or from any other system.

According to one approach, the accessibility rating for a reference, here the stability rating S, is based on metadata associated with the reference. In this case, the instability factor is the metadata that may indicate that the reference R is only temporarily valid. FIG. 1b provides a corresponding example in which an attribute "storage" is set to "temporary".

Such an instability factor may be inferred from the action made by the user. For example, for a local device such as a camera, the instability factor (temporary storage or not) can be inferred from whether the user added the corresponding photo to one of its albums, or marked it as one of its liked photos.

According to another approach, the stability rating may be adjusted based on a history of connections to the network apparatus hosting the reference. For example, the source/target systems may store a history of the references they attempted to resolve and whether the operation succeeded or not. In such a case, if the success rate is for example lower than 80% for a given hosting device, it may be decided that this host will no longer be considered as stable, but as unstable.

If the reference R relates to such instability factor, the stability S value is decreased at step 440. The value of 0.66 is a possible value among possible values. However, more complex mechanisms may be implemented as suggested above in relation to steps 340 and 370.

After step 440, or if there is no instability factor for reference R (step 430), the process ends at step 495.

On the other hand, if it is determined at step 410 that the reference R does not refer to a public network, but to a private network, the process is followed by step 450.

In this step, the stability rating S is set to 0. This is based on the assumption that a reference to a private network is unlikely to remain valid over time.

To illustrate this assumption, if two devices comprising a camera take some photos and establish a local private connection, it may be that the photos will be deleted in the near future as user probably wants to free some memory. Hence, the reference is assumed not to be stable.

As suggested previously, for example for the availability rating A, various factors may lead to increasing the stability rating S.

First, at step 460, it is determined whether frequent connections are made with the hosting device corresponding to the reference R, using for example a history of connections.

If there are frequent connections, the stability rating S is increased to 0.33. As suggested above for the rating A, this value 0.33 is merely an example and may implement other more complex schemes to linearly adjust the value of S between 0 and 0.5 based on the frequency of connections.

After step 470, or in case of non frequent connections, it is checked whether or not the reference R is associated with a stability factor at step 480.

Basically, such a factor may be the contrary of the previously described instability factor, i.e. some information that tends to show that the reference will remain valid over time.

For example, if the creation time of the resource copy associated with the reference R is quite old, then it may be inferred that the resource copy has remained stable on its hosting system for a long time.

Another example of stability factor may be the presence in the description of metadata identifying the resource as stable, as shown in FIG. 1b (storage="stable"). Such "storage" metadata can be added by the source system when it generates a description for a resource, depending on whether the reference R has remained valid for a long time or not, or whether it belongs to user's favourite resources. Even if not present in the metadata, such knowledge may be available, for instance if the considered hosting device publishes a storage policy, or by relying on a service which describes storage policy for various hosting devices.

If a favourable stability factor is found, the stability is increased by 0.33 at step 490. Once again, this value is just provided as an example.

After step 490, or after step 480 if no stability factor is found, the process ends at step 495.

As suggested above for the evaluation of the availability rating A, the process may be simplified by stopping it right after step 420 or step 450 (i.e. without considering the history of connections and any (in)stability factor).

The processing of FIG. 4 and FIG. 5 provides the availability and stability ratings for each reference R of a collection. In the described example, these two ratings form the accessibility rating for the reference R.

The step 130 is now described, aiming at filtering the references according to their usefulness for the target system. In this respect, as shown in FIG. 6, the processing is based on this evaluated accessibility rating to determine whether a reference must be kept or deleted from the list of references before provision to the target system (Bob).

The processing starts at step 500 by obtaining a set SR of at least one reference referring to the same resource.

Then, at step 510, it is determined whether a reference R not yet processed remains in the set SR.

If so, its associated accessibility rating is considered.

First, the associated availability rating A is considered and compared to an availability threshold TA, at step 520.

If the rating A is greater than or equal to the availability threshold TA, the current reference R is marked as processed at step 530 and the process returns to step 510 to consider another reference. In this case, step 530 aims at keeping the references that are useful for the considered target system, given the availability criterion.

Otherwise, the reference R's stability rating S is considered and compared to a stability threshold TS at step 525.

If the rating S is greater than or equal to the stability threshold TS, the reference R is marked as processed at step 530 and the process returns to step 510 to consider another reference. In this case, step 530 aims at keeping the references that are useful for the considered target system, given the stability criterion.

Otherwise, the reference R is removed from the set of references SR at step 540, and the process returns to step 510 to consider another reference. Step 530 aims at deleting the references that have no interest for the considered target system, given both the availability and stability criteria.

When all the references R of the set SR have been processed, the process ends at step 590.

Both thresholds TA and TS may be set to 1. This value is particularly relevant when implementing the simplified versions of FIGS. 4 and 5 (i.e. when the processes end just after the steps 320/350/420/450)

In case the full versions of FIGS. 4 and 5 are implemented, a value of 0.66 may be chosen for the thresholds TA and TS.

In addition, these thresholds are not necessarily equal, and their values may depend on the way of incrementing and decrementing the availability rating A and the stability rating S. For instance, it may be that a value for the rating A and the rating S can only be 0, 0.33, 0.66 and 1 in the above examples. As a consequence, there is no difference in selecting a value of 0.75 and a value of 1 for the thresholds TA and TS.

When exiting the step 130 just described with reference to FIG. 6, an updated list of references, in which the references having no interest for the target user have been deleted, is available and is then possibly sent to this target system. At this stage of processing, the target system is going to handle fewer references than generally provided in the prior art schemes.

Figure 7:
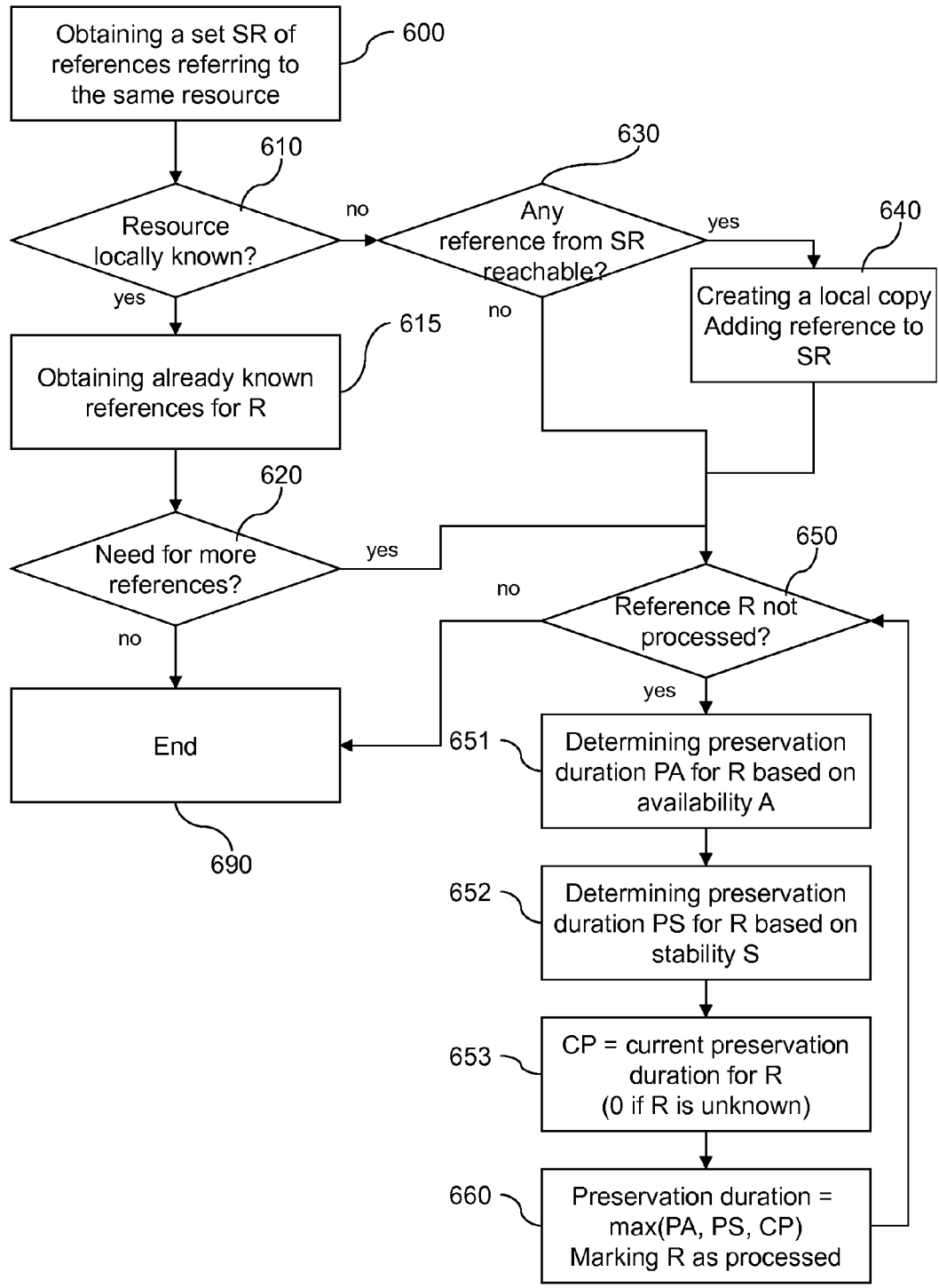
FIG. 7 illustrates, in a flowchart, steps of additional processing of the references provided in the updated list, performed on the target system.

With reference to FIG. 7, a description is now made of further processing that may be performed on the target system to this updated list of references, in order to further reduce the number of references to be handled or to improve accessibility to the corresponding resource (by creating a copy thereof for example).

The process starts at step 600 by obtaining a set SR of at least one reference referring to the same resource. Generally, this is the updated list generated at step 130 and obtained by the target system (upon request for example).

Next, at step 610, it is determined whether the resource corresponding to the set of references is locally known, i.e. whether the resource is already described in the target system's collection.

Various methods can be implemented in this respect.

For example, a simple method relies on identifying a common identifier from the already stored data and the resource of the examined set SR. This is for instance possible with the synchronization extension for Web Feeds "FeedSync" that defines and provides a synchronization identifier enabling safe identification of a resource.

In another method, a comparison between the address (URL) of the examined resource and the address of any reference already known may provide detection of an already locally known resource in the set SR. However, care should be taken not to select certain references such as references known as temporary references, the addresses of which are associated with resources that change over time. This is for example the case for references that designate the "last viewed image", the "first image", "the favourite image", "the last played mp3", etc.

As a last example, it may also be possible to directly compare the resources (or some data characterizing them, such as metadata) with the ones in the local collection (e.g. comparing photos thanks to specific points of interests).

The determination of whether the resource is locally known or not is useful to simplify the processing, since some references may already be known (that may be a local reference or a reference to a remote hosting system) for this resource. Therefore, if the resource is locally known, the references already known for this resource are obtained at step 615, without additional processing.

Next, at step 620, it is checked whether additional references are needed. This is because, since some references are already available, it may not be necessary to add new ones.

For instance, a target device may decide that as soon as one public reference and one local reference are available, there is no need for more references.

According to another example, in case of multimedia resources, the video quality may be another criterion: e.g. if there is no reference for an HD version of a video, then such a reference is needed.

Such determination as to whether or not additional references are needed may imply examining the references from the set SR in order to check whether any of them covers a use-case for which a reference is needed.

Furthermore, when determining whether or not additional references are needed, a preservation duration (as defined below) of an already-known reference may be considered. For example if an already-known reference of a use-case is considered to end soon (i.e. if it is believed to be unreachable within short time—specified via the preservation duration), it may be considered that a new reference is needed for the same use-case.

If there is a need for more references, then the process goes to step 650 described below.

Otherwise, the process ends at step 690.

Back to step 610, if the resource is not locally known, a local copy of the resource may be created using a reference of the updated list; and a new reference pointing to the local copy thus created may be added to the list of references.

In this respect, if the resource is not locally known, it is determined whether any of the references of the set SR is reachable at step 630.

If a reference is reachable, then a local copy of the resource is created at step 640 by retrieving the resource at the reachable reference. In addition, a corresponding reference is added to the set SR of references.

It is remarkable to note that this new reference is always reachable by the target system considered, since the reference refers to the target system itself. For example, if the target system hosts a web server, the new reference may be a URL pointing to the web server of the system.

It should be noted that this local copy is not necessarily an exact copy of the resource as retrieved through the reachable reference. For instance, if the resource is large (e.g. a high quality photo), then the copy may be a degraded copy (e.g. a thumbnail).

In particular, if no reference is reachable but a small size version of the resource is included in the description within the collection (this may be the case for a thumbnail associated with a photo), then this small size version of the resource may be used as a local copy for step 640.

After step 640 or if no reference is reachable (output "no" from step 630) or if there is a need for additional references (output "yes" step 620), the process is followed by step 650 where each reference R of the set SR is successively considered to perform the steps 651-652-653-660.

These steps makes it possible, for each reference of the updated list (the set SR), to evaluate, based on the corresponding accessibility rating (ratings A and S), a period of accessibility (or "preservation duration") for the target system of the copy corresponding to the reference. Such evaluation of periods of accessibility may then be taken into account to select a particular reference for accessing the resource.

A preservation duration PD for the reference R is determined based on its availability and stability ratings A and S.

One possible way to obtain such a preservation duration is provided here for illustrative purpose.

Firstly, at step 651, a preservation duration PA is determined based on the availability rating A associated with the reference R.

Typically, various intervals can be defined for the possible values of the rating A, and several preservation durations PA may be associated with each interval: e.g. 1 hour for a value of the rating A between 0 and 0.32, 6 hours for a value of A between 0.33 and 0.65, 1 day for a value of A between 0.66 and 0.99, and infinity for a value of A of 1.

Secondly, at step 652, another preservation duration PS is determined based on the value of the stability rating S associated with the reference R. This may be done in the same way as for the preservation duration PA at step 651.

Then, at step 653, the current preservation duration CP for the reference R considered is obtained: if the reference R is not known, this duration CP is set to zero, otherwise it is the remaining time of the last determined preservation duration PD for the same reference R, given the current time elapsed since then.

Eventually, at step 660, the preservation duration PD for the resource R is set to the maximum of the durations PA, PS and CP. At the same time, the reference R is marked as processed to permit block 650 to determine whether or not all the references have been processed.

The process then returns to step 650 to check whether there remains a reference R not yet processed. When all the references from the set SR have been processed, the process ends at step 690.

Other methods for obtaining a preservation duration PD for a reference R can be applied. Above, the maximum value between PA, PS and CP is chosen, avoiding the removal of a reference that may be useful for the target system. This is because, even if PA and CP are very low (which tends to indicate that the reference is not likely to be useful), the reference may be kept for a long time if PS is high.

Another solution may be to keep references only if they are very likely to be useful. In this respect, the minimum value of PA, PS and CP may be selected as the preservation duration PD for a reference.

Alternatively, the maximum or the minimum of PA and PS may be selected, and then combined with current preservation duration CP in order to determine the new preservation duration PD. As an example, the new value PD may be 0.5*CP+ 0.5*min(PA, PS).

In one embodiment of the invention, a strategy for updating the preservation duration may be implemented. This is because the preservation duration determined for a given resource is not meant to be definitive.

For example, for references referring to a hosting system to which a target system is connected, the preservation duration PD may be updated periodically as long as the target system remains connected to the hosting system.

Another option may consist in setting the preservation duration PD to values such as "as long as the connection is alive". Indeed, for references belonging to private networks, there may be no interest in keeping them after the connection has ended, even if it may be efficient to keep these references for a little longer just in case the connection is accidentally lost.

With reference to FIG. 8, a description is now given by way of example of a particular hardware configuration of an information processing device adapted for an implementation of the method according to the invention.

A user device implementing the present invention is for example a micro-computer 40, a workstation, a personal assistant, or a mobile telephone connected to different peripherals. According to still another embodiment of the invention, the user device takes the form of a camera provided with a communication interface to enable connection to a network.

The peripherals connected to the information processing device comprise for example a digital camera 60, or a scanner or a camcorder or any other means of image acquisition or storage, connected to an input/output graphics card (not shown) and supplying multimedia data to the information processing device.

The peripherals may also comprise a microphone 61 and an input/output card (not shown). The device 40 comprises a communication bus 41 to which there are connected:

- a central processing unit CPU 42 taking for example the form of a microprocessor;
- a read only memory 43 which may contain the programs whose execution enables the implementation of the method according to the invention;
- a random access memory 44, which, after powering up of the device 40, contains the executable code of the programs of the invention as well as registers adapted to record variables and parameters necessary for the implementation of the invention;
- a screen 45 for displaying data and/or serving as a graphical interface with the user, who may thus interact with the programs according to the invention, using a keyboard 46 or any other means such as a pointing device, for example a mouse 47 or an optical stylus;
- a hard disk 48 or a storage memory, such as a compact flash type card, able to contain the programs of the invention as well as data used or produced on implementation of the invention;
- an optional disk drive 49, or another reader for a removable data carrier, adapted to receive an external disk 70 and to read/write thereon data processed or to process in accordance with the invention; and
- a communication interface 50 connected to a telecommunications network 80, the interface 50 being adapted to transmit and receive digital data.

The communication bus 41 permits communication and interoperability between the different elements included in the device 40 or connected to it. The representation of the bus 41 is non-limiting and, in particular, the central processing unit 42 unit may communicate instructions to any element of the device 40 directly or by means of another element of the device 40.

The external disks 70 can be any information carrier such as a compact disc (CD-ROM) rewritable or not, a ZIP disk or a memory card. Generally, an information storage means, which can be read by a micro-computer or microprocessor, integrated or not into the information processing device, and which may possibly be removable, is adapted to store one or more programs whose execution permits the implementation of the method according to the invention.

The executable code enabling the information processing device to implement the invention may be stored in read only memory 43, on the hard disk 48 or on a removable digital medium such as an external disk 70 as described earlier. According to a variant, the executable code of the programs is received by the intermediary of the telecommunications network 80, via the interface 50, to be stored in one of the storage means of the device 40 (such as the hard disk 48) before being executed.

The central processing unit 42 controls and directs the execution of the instructions or portions of software code of the program or programs of the invention, the instructions or portions of software code being stored in one of the aforementioned storage means. On powering up of the device 40, the program or programs which are stored in a non-volatile memory, for example the hard disk 48 or the read only memory 43, are transferred into the random-access memory 44, which then contains the executable code of the program or programs of the invention, as well as registers for storing the variables and parameters necessary for implementation of the invention.

It will also be noted that the device implementing the invention or incorporating it may also be implemented in the form of a programmed apparatus. For example, such a device may then contain the code of the computer program(s) in a fixed form in an application specific integrated circuit (ASIC).

The device described here and, particularly, the central processing unit 42, may implement all or part of the processing operations described in relation to FIGS. 1 to 7, to implement the method according to the present invention and constitute a corresponding device according to the present invention.

The preceding examples are only embodiments of the invention which is not limited thereto.

The invention claimed is:

1. A method for managing access to a resource for a given user device, a plurality of copies of the resource being hosted in a respective plurality of apparatuses of one or more networks, the method comprising:

obtaining a list comprising a plurality of references pointing to the plurality of copies of the resource;

for each of said references, determining at least one accessibility rating representing an accessibility of the copy corresponding to the at least one accessibility rating for the given user device, and, based on the at least one accessibility rating, deciding between keeping the reference corresponding to the at least one accessibility rating in the list or deleting the reference therefrom, to obtain an updated list, wherein the at least one accessibility rating for a reference comprises a stability rating representing the ability of the copy corresponding to the at least one accessibility rating to remain present and valid over time on a network hosting apparatus corresponding to the at least one accessibility rating; and selecting a reference from the updated list for the given user device to access the resource.

2. The method of claim 1, further comprising providing the updated list from a first user system to the given user device through a communications network, and wherein the obtaining, the determining and the deciding are performed on the first user system.

3. The method of claim 2, wherein the first user system determines whether the copy at said reference corresponding to the at least one accessibility rating is reachable by the given user device, and if not assigns a low accessibility for the reference.

4. The method of claim 1, performed on the given user device.

5. The method of claim 1, wherein the at least one accessibility rating for a reference is based on a connection criterion or connection criteria.

6. The method of claim 5, wherein the at least one accessibility rating for a reference comprises an availability rating representing an ability of the network hosting apparatus corresponding to the at least one accessibility rating to be reached by any user on a network.

7. The method of claim 6, wherein the stability or availability rating for a reference is a function of a private or public nature of the network to which the network hosting apparatus corresponding to the at least one accessibility rating belongs, and in case the hosting apparatus corresponding to the at least one accessibility rating belongs to a local or private network, the stability or availability rating for the reference is furthermore a function of the belonging or non-belonging of the given user device to the local or private network.

8. The method of claim 6, wherein the stability or availability rating for a reference is further adjusted based on a history of connections to the network hosting apparatus corresponding to the at least one accessibility rating.

9. The method of claim 1, wherein the updated list is provided in a web feed format.

10. The method of claim 1, further comprising obtaining the updated list by the given user device; and, for each reference of the obtained list, evaluating, by the given user device and based on the at least one accessibility rating corresponding to the reference, a period of accessibility to the copy corresponding to the reference for the given user device, wherein the given user device takes into account the period of accessibility to select a reference for accessing the resource.

11. The method of claim 10, further comprising, if the resource corresponding to the obtained updated list is not locally known by the given user device, creating a local copy of the resource by using a reference of the obtained updated list; and adding, to the obtained updated list, a new reference pointing to the local copy thus created.

12. The method of claim 11, wherein the created copy is a degraded version of the copy pointed to by the reference used.

13. The method of claim 10, further comprising periodically updating the evaluation of the period of accessibility.

14. The method of claim 10, wherein an evaluated accessibility period for a reference depends on a first accessibility period determined based on a stability rating associated with the reference, on a second accessibility period determined based on an availability rating associated with the reference, and on a current accessibility period related to the remaining time of an accessibility period evaluated earlier.

15. The method of claim 6, wherein the stability or availability rating for a reference is a function of a private or public nature of the network to which the corresponding network hosting apparatus belongs, and in case the hosting apparatus belongs to a local or private network, the stability or availability rating for the reference is furthermore a function of the belonging or non-belonging of the given user device to the local or private network.

16. The method of claim 6, wherein the stability or availability rating for a reference is further adjusted based on a history of connections to the network hosting apparatus corresponding to the at least one accessibility rating.

17. A method for managing access to a resource for a given user device, a plurality of copies of the resource being hosted in a respective plurality of apparatuses of one or more networks, the method comprising:

obtaining a list comprising a plurality of references pointing to the plurality of copies of the resource;

for each of said references, determining at least one accessibility rating representing an accessibility of the corresponding copy for the given user device, and, based on the at least one accessibility rating, deciding between keeping the reference corresponding to the at least one accessibility rating in the list or deleting the reference corresponding to the at least one accessibility rating therefrom, to obtain an updated list, wherein the at least one accessibility rating for a reference is a function of a private or public nature of the network to which the network hosting apparatus corresponding to the at least one accessibility rating belongs, and in case the hosting apparatus corresponding to the at least one accessibility rating belongs to a local or private network, the at least one accessibility rating for the reference is furthermore a function of the belonging or non-belonging of the given user device to the local or private network; and selecting a reference from the updated list for the given user device to access the resource.

18. A system for managing access to a resource for a given user device, a plurality of copies of the resource being hosted in a respective plurality of apparatuses of one or more networks, the system comprising:

a memory;

a processor coupled to the memory which executes the following:

obtaining a list comprising a plurality of references pointing to the plurality of copies of the resource;

determining, for each of said references, at least one accessibility rating representing an accessibility of the copy corresponding to the at least one accessibility rating for the given user device, and for deciding, based on the at least one accessibility rating, between keeping the reference corresponding to the at least one accessibility rating in the list or deleting the reference therefrom, to obtain an updated list; wherein the at least one accessibility rating for a reference comprises a stability rating representing the ability of the copy corresponding to the at least one accessibility rating to remain present and valid over time on a network hosting apparatus corresponding to the at least one accessibility rating, and selecting a reference from the updated list for the given user device to access the resource.

19. A non-transitory computer-readable medium storing a program which, when executed by a processor or computer system in an apparatus for managing access to a resource for a given user device wherein a plurality of copies of the resource being hosted in a respective plurality of apparatuses of one or more networks, causes the apparatus to:

obtain a list comprising a plurality of references pointing to the plurality of copies of the resource;

for each of said references, determine at least one accessibility rating representing an accessibility of the copy corresponding to the at least one accessibility rating for the given user device, and, based on the at least one accessibility rating, deciding between keeping the reference corresponding to the at least one accessibility rating in the list or deleting the reference therefrom, to obtain an updated list, wherein the at least one accessibility rating for a reference comprises a stability rating representing the ability of the copy corresponding to the at least one accessibility rating to remain present and valid over time on a network hosting apparatus corresponding to the at least one accessibility rating; and select a reference from the updated list for the given user device to access the resource.

20. A non-transitory computer-readable medium storing a program which, when executed by a processor or computer system in an apparatus for managing access to a resource for a given user device wherein a plurality of copies of the resource being hosted in a respective plurality of apparatuses of one or more networks, causes the apparatus to:

obtain a list comprising a plurality of references pointing to the plurality of copies of the resource;

for each of said references, determine at least one accessibility rating representing an accessibility of the corresponding copy for the given user device, and, based on the at least one accessibility rating, deciding between keeping the reference corresponding to the at least one accessibility rating in the list or deleting the reference corresponding to the at least one accessibility rating therefrom, to obtain an updated list, wherein the at least one accessibility rating for a reference is a function of a private or public nature of the network to which network hosting apparatus corresponding to the at least one accessibility rating belongs, and in case the hosting apparatus corresponding to the at least one accessibility rating belongs to a local or private network, the at least one accessibility rating for the reference is furthermore a function of the belonging or non-belonging of the given user device to the local or private network; and select a reference from the updated list for the given user device to access the resource.

* * * * *